E. KADDATZ.
MILK TESTER.
APPLICATION FILED APR. 27, 1918.
1,293,793.
Patented Feb. 11, 1919.
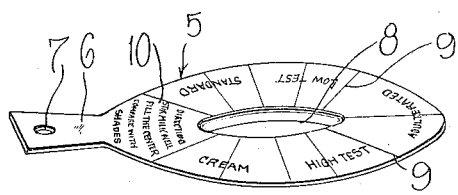
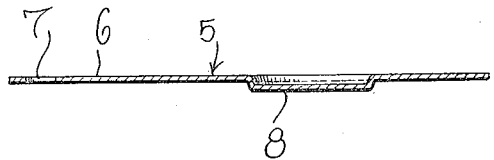
Inventor
E. Kaddatz
By Watson E. Coleman
Attorney

UNITED STATES PATENT OFFICE.

EMIL KADDATZ, OF ORTONVILLE, MINNESOTA.

MILK-TESTER.

1,293,793.   Specification of Letters Patent.   Patented Feb. 11, 1919.

Application filed April 27, 1918.   Serial No. 231,158.

*To all whom it may concern:*

Be it known that I, EMIL KADDATZ, a citizen of the United States, residing at Ortonville, in the county of Bigstone and State of Minnesota, have invented certain new and useful Improvements in Milk-Testers, of which the following is a specification, reference being had to the accompanying drawings.

This invention relates to an improved milk tester whereby the individual purchaser may readily ascertain whether the milk contains the standard percentage of fat, or has been adulterated.

It is also an object of the invention to provide a device for the above purpose which is exceedingly simple in its construction and may be manufactured and sold at very small cost.

It is a more particular object of the invention to provide a milk testing device constructed in a single stamping operation from sheet metal and having a central depressed portion to receive the milk to be tested and a surrounding color field having variously colored or shaded sectors indicative of the quality of the milk.

With the above and other objects in view, the invention consists in the improved form and construction of the several parts of the device as will be hereinafter more fully described, subsequently claimed and illustrated in the accompanying drawing in which similar reference characters designate corresponding parts throughout the several views, and wherein:

Figure 1 is a perspective view showing the preferred embodiment of the invention; and Fig. 2 is a sectional view thereof.

Referring in detail to the drawing, 5 designates the body of the device, which is stamped out of a plate of tin or other suitable sheet metal and is preferably of circular form in plan. This sheet metal body or disk is provided upon its perimeter with a laterally projecting handle 6 disposed in the plane of said disk, said handle having an aperture 7 in its end adapted to receive a nail or hook from which the device may be suspended.

The body or disk 5 is centrally formed with a depressed circular portion 8, the surface of which is preferably of dark slate color. The surrounding surface of the plate or disk is marked off by the radial lines indicated at 9 into sectors 10. These sector-shaped surfaces of the disk are colored various shades corresponding to the color of milk containing different percentages of animal fats. In one of the sectors 10, proper directions are printed for the use of the device. Upon the surface of the disk and extending upon adjacent color shades in the sectors 10 are printed the words " Low test," " Standard," " Cream," and " High test," and in a single one of the sectors 10 the word "Adulterated" is printed.

In the use of the device, a small quantity of the milk to be tested is placed in the central depression 8 of the metal disk, and the color of the milk is compared with the shades on the surface of the disk and the quality of the milk purchased thus readily ascertained. The comparison may be readily made with the naked eye, though by covering the milk with a clear glass, the color thereof will be brought out in somewhat clearer contrast to the surrounding shades. It will thus be seen that I have devised a very simple and reliable testing device for milk, whereby the housewife may easily ascertain whether or not the milk has been adulterated. If desired, in order that the surface of the disk may be easily cleaned and maintained in a thoroughly sanitary condition, the disk surface may be enameled and the shades or colors applied to the enameled surface. It will also be understood that the device may be made in various sizes, shapes, and also of other material than sheet metal, as for instance, china, porcelain, or the like.

While I have herein shown and described the preferred form and construction of the several parts of the device, it is to be understood that the same are susceptible of many minor modifications and I therefore reserve the privilege of adopting all such legitimate changes as may be fairly embodied within the spirit and scope of the invention as claimed.

I claim:—

1. A milk testing device consisting of a flat disk-like body having a central depressed portion to receive the milk, the surface of said body having variously colored sectors radiating from the depression.

2. A milk testing device consisting of a flat disk-like body having a central depressed portion to receive the milk, the surface of said body having variously colored sectors radiating from the depression, said body being provided with an integral handle extending laterally from its perimeter and in the plane of said body.

3. A milk testing device consisting of a circular sheet metal disk having a central depressed portion and a handle projecting laterally from its perimeter in the plane of the disk, the surface of the disk being provided with variously colored sectors extending radially from the depression to the outer edge of the disk.

In testimony whereof I hereunto affix my signature in the presence of two witnesses.

EMIL KADDATZ.

Witnesses:
 DAVID E. GEIER,
 JOHN TIMM.